UNITED STATES PATENT OFFICE.

E. FREEMAN PRENTISS, OF PHILADELPHIA, PENNSYLVANIA.

IMPROVEMENT IN COMPOSITIONS FOR COATING WOOD AND IRON.

Specification forming part of Letters Patent No. 142,117, dated August 26, 1873; application filed July 28, 1873.

*To all whom it may concern:*

Be it known that I, E. FREEMAN PRENTISS, of Philadelphia, Pennsylvania, have invented a Composition for Coating Wood and Iron, of which the following is a specification:

This composition is intended to be used principally for coating iron pipes and the bottoms of ships built either of wood or iron. My invention consists of a composition resulting from the mixture of a solution of gum-shellac with the oxide of iron, plumbago, and lamp-black, adding to these ingredients, when the composition is intended for ships' bottoms, verdigris or Brunswick green.

To make the composition, I mix the ingredients in the following proportions, to wit: One and a half pound of shellac and one gallon of alcohol, stirring them until the shellac is dissolved. I then add to the solution oxide of iron, plumbago, lamp-black, and verdigris or Brunswick green, all in a powdered state, in about equal parts by weight—enough in the aggregate to make with the said solution a compound sufficiently liquid to be applied, like ordinary oil-paint, with a brush.

I claim—

The composition consisting of a solution of gum-shellac mixed with the oxide of iron, plumbago, lamp-black, and verdigris or Brunswick green, substantially as and for the purpose specified.

E. FREEMAN PRENTISS.

Witnesses:
WM. HARTLEY MILLER,
SAMUEL RICHARDS.